(12) United States Patent
Yanamala et al.

(10) Patent No.: US 11,928,049 B2
(45) Date of Patent: Mar. 12, 2024

(54) BLOCKCHAIN SYSTEM FOR SOURCE CODE TESTING AND SCRIPT GENERATION WITH ARTIFICIAL INTELLIGENCE

(71) Applicant: Bank of America Corporation, Charlotte, NC (US)

(72) Inventors: Obi Reddy Yanamala, Hyderabad (IN); Kumaresan Karuppiah, Chennai (IN); Vinay Jaisinghani, Navi Mumbai (IN); Ravi Ranjan Shandilya, Hyderabad (IN); Samson Paulraj, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 177 days.

(21) Appl. No.: 17/315,745

(22) Filed: May 10, 2021

(65) Prior Publication Data
US 2022/0358030 A1 Nov. 10, 2022

(51) Int. Cl.
| | |
|---|---|
| G06F 11/36 | (2006.01) |
| G06F 8/65 | (2018.01) |
| G06F 16/27 | (2019.01) |
| G06F 21/60 | (2013.01) |
| G06N 5/04 | (2023.01) |
| H04L 9/32 | (2006.01) |
| H04L 9/00 | (2022.01) |

(52) U.S. Cl.
CPC ............ *G06F 11/3684* (2013.01); *G06F 8/65* (2013.01); *G06F 11/3664* (2013.01); *G06F 16/27* (2019.01); *G06F 21/604* (2013.01); *G06N 5/04* (2013.01); *H04L 9/3239* (2013.01); *G06F 11/3688* (2013.01); *H04L 9/50* (2022.05)

(58) Field of Classification Search
CPC ............ G06F 11/3664; G06F 11/3684; G06F 11/3688; G06F 11/3696; G06F 11/3672; G06F 8/33; G06F 8/36; G06F 8/60; G06F 8/65
See application file for complete search history.

(56) References Cited

U.S. PATENT DOCUMENTS

| | | |
|---|---|---|
| 7,133,805 B1 | 11/2006 | Dankenbring et al. |
| 8,473,916 B2 | 6/2013 | Venkatraman et al. |
| 10,002,216 B2 | 6/2018 | Ikram et al. |
| 10,579,368 B2 | 3/2020 | Wisnovsky |

(Continued)

FOREIGN PATENT DOCUMENTS

| | | |
|---|---|---|
| EP | 3113016 A1 | 1/2017 |
| WO | 2020030891 A1 | 2/2020 |

OTHER PUBLICATIONS

Borie, Blockchains for non-cryptocurrency applications don't make sense; https://rjevski.io/blog/blockchains-for-non-cryptocurrency-applications-don-t-make-sense; blog, 3 pp. downloaded Feb. 22, 2021.

(Continued)

*Primary Examiner* — Duy Khuong T Nguyen
(74) *Attorney, Agent, or Firm* — Banner & Witcoff, Ltd.

(57) ABSTRACT

Aspects of this disclosure relate to a blockchain system for management of scripts associated with software applications. The blockchain system may be supplemented by an artificial intelligence (AI)-based system for generation of test scripts. The blockchain system may employ smart contracts for submission and validation of scripts by different nodes of a peer-to-peer (P2P) network.

18 Claims, 12 Drawing Sheets

(56) References Cited

U.S. PATENT DOCUMENTS

| | | |
|---|---|---|
| 10,700,851 B2 | 6/2020 | Lin et al. |
| 2012/0192153 A1 | 7/2012 | Venkatraman et al. |
| 2019/0327080 A1 | 10/2019 | Liu et al. |
| 2019/0392118 A1 | 12/2019 | Elden et al. |
| 2020/0145196 A1 | 5/2020 | Lin et al. |
| 2021/0157954 A1 | 5/2021 | Majko-Ruben |
| 2021/0191930 A1 | 6/2021 | Zeng et al. |
| 2021/0382813 A1 | 12/2021 | Moondhra et al. |

OTHER PUBLICATIONS

Paul's Internet Landfill/ 2019/ Version Control on the Blockchain; pnijar.freeshell.org/2019/git-blockchain/; article, 4 pp.; downloaded Feb. 22, 2021; Created Feb. 7, 2019; Last edited Feb. 7, 2019.

Ask HN: Should I use version control or blockchain? | Hacker News; https://news.ycombinator.com/item?id=21881238; blog, 3 pp.; downloaded Feb. 22, 2021.

Turpitka et all.; How To Create A Well-Planned Testing Strategy For Blockchain-Based Solutions; https://www.forbes.com/sites/forbestechcouncil/2020/03/12/how-to-create-a-well-planned-testing-strategy-for-blockchain-based-solutions/?sh=6c1d5c...article, 4 pp., Forbes Technology Council; Mar. 12, 2020.

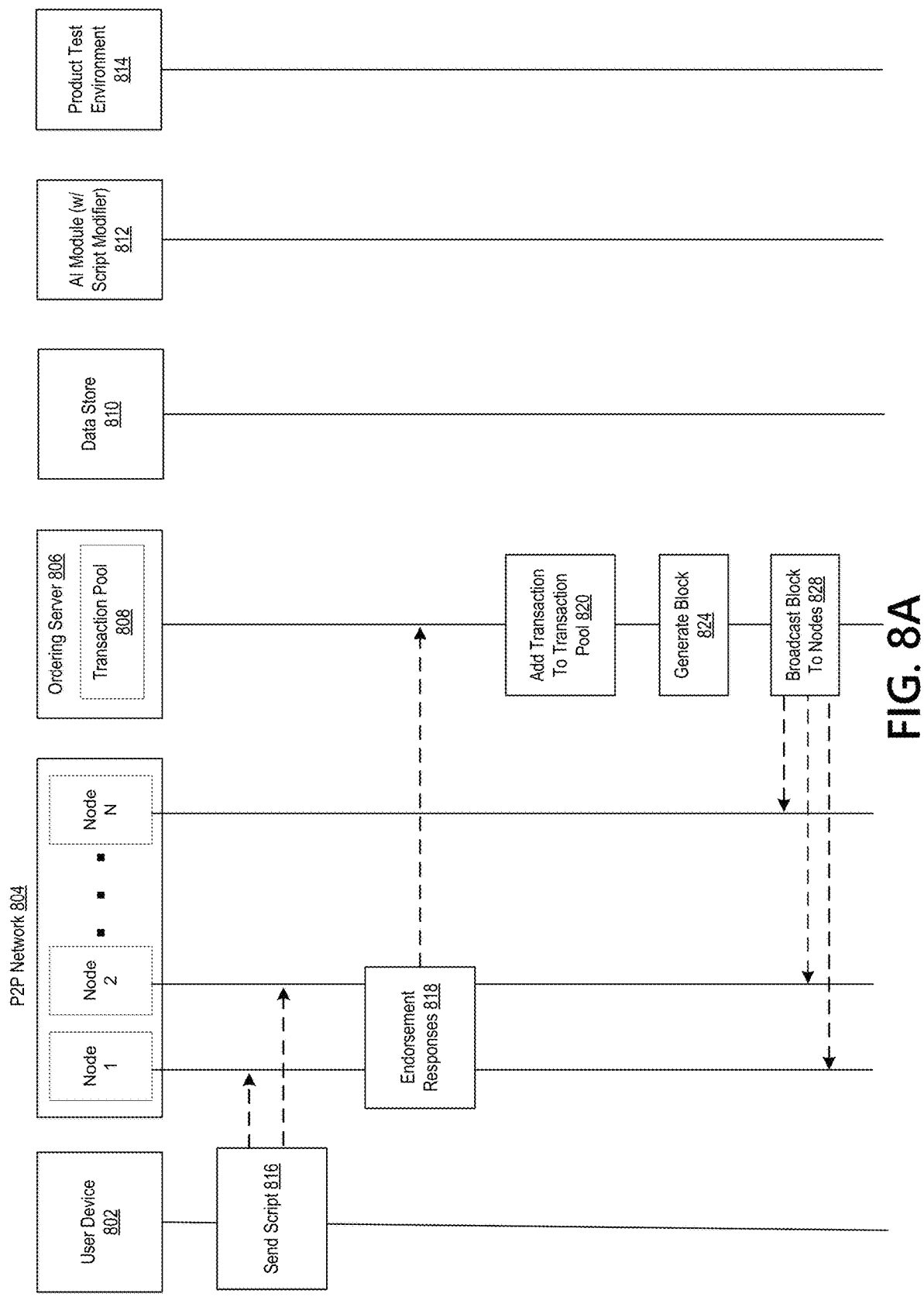

BLOCKCHAIN SYSTEM FOR SOURCE CODE TESTING AND SCRIPT GENERATION WITH ARTIFICIAL INTELLIGENCE

TECHNICAL FIELD

Aspects of the disclosure relate to blockchain management, and more specifically, to use of blockchain systems for software development.

BACKGROUND

Blockchain-based technologies have seen increasing use for a wide range of applications. Secure, immutable, and distributed storage of information, and decentralized validation are some of the aspects that have led to increasing adoption of these technologies across a range of application areas. The most widespread and visible application of blockchains is in the domain of crypto-currency. However, the technology may be used for any application where decentralized and distributed operation is desirable.

In the software development lifecycle (SDLC), it is commonplace to add and/or test new software modules. It's also banal to test a software module or computer code that has been redesigned or modified due to a request from a business team or because of errors/bugs in the code. Regression testing is done to make sure the new patched code (or the modified impacted code) do not affect the existing, whole functionality in any negative way. In large projects, regression testing may be a tremendous, daunting process. It sometime means needing to verify the complete product/suite even after a minimal or particular business functionality change.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues associated with management of scripts associated with software applications. One or more of the aspects herein relate to the use of blockchains for recording and validating scripts. Additional aspects herein relate to the use of machine learning-based techniques for generation of test scripts.

In accordance with one or more arrangements, a system for validating and updating scripts associated with a plurality of software components of a software application may comprise a user computing device, a plurality of nodes of a peer-to-peer network, and an ordering server. The user computing device may receive user input comprising a script associated with a software component of the plurality of software components. The user computer device may send the script to a plurality of nodes of a peer-to-peer (P2P) network and an ordering server. Each of the plurality of nodes may be associated with a corresponding local copy of a blockchain. Each of the plurality of nodes of the P2P network may be configured to send a corresponding endorsement response for the script. The ordering server may receive, from the plurality of nodes of the P2P network, endorsement responses and generate a new block for addition to the local copies of the blockchain. Generating the new block may comprise generating a hash value based on the script, the endorsement responses, and an immediately preceding block hash in the blockchain. The new block may comprise the script, the endorsement responses, the generated hash value, and the immediately preceding block hash in the blockchain. The ordering server may send, to the plurality of nodes of the P2P network, the new block. Each of plurality of nodes may be configured to add the new block to the corresponding local copy of the blockchain.

In some arrangements, the plurality of nodes may be associated with corresponding local copies of a world state. The plurality of nodes may be configured to update, based on the endorsement responses indicating that a majority of the plurality of nodes have validated the script associated with the software component, the corresponding local copies of the world state to indicate the script.

In some arrangements, the system may further comprise an artificial intelligence (AI) engine configured to generate one or more test scripts, for one or more software components of the plurality of software components, based on updating of the corresponding local copies of the world state to indicate the script. The AI engine may determine the one or more software components based on determining linkages between the one or more software components and the software component.

In some arrangements, sending the script may comprise invoking a smart contract for execution at the plurality of nodes. The smart contract may be stored in the local copies of the blockchain. Executing the smart contract at the plurality of nodes may comprise determining if a user associated with the user computing device is authorized to submit the script. The script may comprise an update for the software component. Executing the smart contract at the plurality of nodes may comprise updating the software component based on the script. The script may be for inclusion in the software component. Executing the smart contract at the plurality of nodes may comprise updating the software component by including the script.

In some arrangements, the script may be a test script for regression testing of the software component. In some arrangements, sending the script associated with the software component to the plurality of nodes may be based on determining that the plurality of nodes comprises endorsing nodes of the software component.

In accordance with one or more arrangements, a system may be used for generating and updating test scripts associated with a software application. The system may comprise a user computing device, an ordering server, a plurality of nodes of a peer-to-peer (P2P) network, and an AI engine. The user computing device may receive user input comprising a script associated with a software component of a plurality of software components of the software application. The user computing device may send the script to a plurality of nodes of a peer-to-peer (P2P) network and an ordering server. The ordering server may receive, from the plurality of nodes of the P2P network, endorsement responses corresponding to the script. Further, the ordering server may generate a block comprising the script and the endorsement responses corresponding to the script. The ordering server may send, to the plurality of nodes of the P2P network, the block. Each of the plurality of nodes may add the block to a corresponding local copy of a blockchain and update a corresponding local copy of a world state to indicate the script. The AI engine may determine, based on the world state indicating the script, one or more software components, of the plurality of software components, for which associated test scripts need to be modified, and modify the associated test scripts. The ordering server may generate a second block, wherein the second block may comprise the modified test scripts. The ordering server may send, to the plurality of nodes of the P2P network, the block. Each of plurality of nodes may be configured to add the second block to the corresponding local copy of the blockchain.

In some arrangements, the AI engine may determine the one or more software components based on: linkages between the software component and the one or more software components; and similarity indices of the software component and the one or more software components.

In some arrangements, the AI engine may be configured to send the modified test scripts to the plurality of nodes. The ordering server may generate the second block based on receiving, from the plurality of nodes, endorsement responses corresponding to the modified test scripts. The second block may comprise the endorsement responses corresponding to the modified test scripts.

In some arrangements, each of the plurality of nodes may update, based on the endorsement responses corresponding to the modified test scripts indicating that a majority of the plurality of nodes have validated the test scripts, the corresponding local copy of the world state to indicate the test scripts.

In some arrangements, the system may further comprise a test server configured to execute the modified test scripts. The AI engine may determine, during the execution of the modified test scripts, one or more performance parameters. The one or more performance parameters may comprise one of: central processing unit (CPU) usage associated with the test server, memory usage associated with the test server, and combination thereof. The AI engine may be configured to send indications of the one or more performance parameters to the user computing device.

In some arrangements, generating the block may comprise generating a hash value based on the script, the endorsement responses, and an immediately preceding block hash in the blockchain. The block may comprise the script, the endorsement responses, the generated hash value, and the immediately preceding block hash in the blockchain.

These features, along with many others, are discussed in greater detail below.

BRIEF DESCRIPTION OF THE DRAWINGS

FIGS. 8A and 8B depicts an example event sequence for script submission, validation, and/or test script generation in accordance with one or more illustrative aspects described herein.

DETAILED DESCRIPTION

Figure 1:
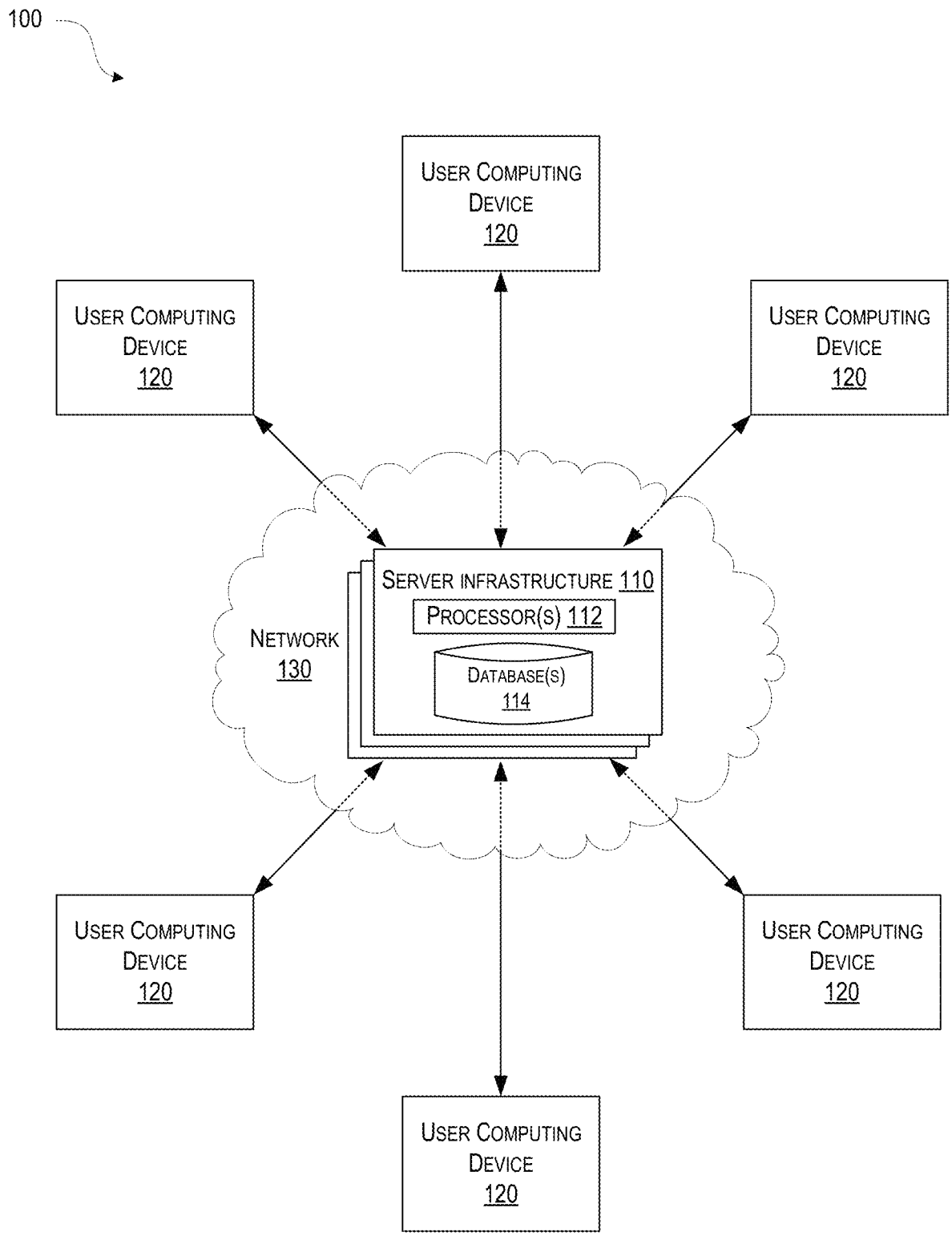
FIG. 1 depicts an illustrative example of centralized computer system in accordance with one or more illustrative aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. The examples and arrangements described are merely some example arrangements in which the systems described herein may be used. Various other arrangements employing aspects described herein may be used without departing from the invention.

Software projects may involve multiple teams working on development/maintenance of different modules associated with a software system. Changes made to scripts may need to be communicated with other teams to inform them and/or seek approval. Further, changes made to a script may require updates to corresponding test scripts and/or development of new test scripts. This may require communicating the changes to a testing team. Maintaining coordination between multiple teams of developers and testers may involve using messaging systems (e.g., emails) or maintaining a central database for recording changes/additions made to scripts and providing approvals. However, this manual approach for software development, testing, and coordination may have multiple disadvantages. For example, the software system may comprise multiple modules and it may be difficult for development and testing teams to determine which modules may be impacted based on updates made to another module. A testing team may be unable to accurately determine which test scripts need to be updated and may result in some modules remaining untested. Large projects may comprise multiple modules and it may become difficult to trace script/component changes for focused testing.

The disclosure provided herein is described, at least in part, in relation to a decentralized peer-to-peer (e.g., P2P) system specialized for various operations associated with development and maintenance of a software system (e.g., operations associated with software development lifecycle (SDLC)). The decentralized P2P system may be comprised of computing devices/systems that are distributed in multiple locations. The computing devices/systems forming the decentralized P2P system may interact with each other to facilitate communications regarding addition/updates to code/test scripts associated with the software system. The decentralized P2P system may manage a blockchain, which may be a data structure used to store information related to the software code/test scripts. More specifically, the blockchain may be a chronological linkage of updates to code/test scripts that may be accessible by authorized users in the decentralized P2P system. The decentralized P2P system may use smart contracts to manage approvals of new additions/modifications to the software system.

In an example arrangement, a system may validate and update scripts associated with a plurality of software components of a software application. The system may comprise a user computing device, a plurality of nodes of a P2P network, and an ordering server. The user computing device may be configured to receive user input comprising a script associated with a software component of the plurality of software components. The user computing device may send the script to a plurality of nodes of the P2P network. Each of the plurality of nodes may be associated with a corresponding local copy of a blockchain, and each of the plurality of nodes of the P2P network may be configured to send a corresponding endorsement response for the script. The ordering server may be configured to receive, from the plurality of nodes of the P2P network, endorsement responses. Further, the ordering server may generate a new block for addition to the local copies of the blockchain. The new block may comprise the script and the endorsement responses. Generating the new block may comprise: generating a hash value corresponding to the script and the endorsement responses, and generating the new block using the generated hash value and an immediately preceding block hash in the blockchain. The ordering server may send, to the plurality of nodes of the P2P network, the new block. Each of plurality of nodes may be configured to add the new block to the corresponding local copy of the blockchain.

A software system may comprise a plurality of modules/components. Each of the modules may be associated with one or more test scripts. For example, test scripts may enable regression testing to ensure that any new code or modified code associated with the module does not negatively impact the module or other modules that it may interact with. Additional aspects of the disclosure relate to artificial intelligence (AI)-based generation of test scripts based on modifications made to a module of the software system. An AI engine may determine one or more other modules of the software system that may be impacted by changes to the module. The AI engine may further determine changes to existing test scripts and/or new test scripts that may be required based on the modifications. The blockchain (that may store indications of updates to code) may interact with an AI engine to facilitate one or more of the above functions.

In an example arrangement, a system may generate and/or update test scripts associated with a software application. The system may comprise a user computing device, an ordering server, and an artificial intelligence (AI) module. The user computing device may receive user input comprising a script associated with a software component of the plurality of software components and send the script to a plurality of nodes of a P2P network. The ordering server may receive, from the plurality of nodes of the P2P network, endorsement responses corresponding to the script. Further, the ordering server may generate a block for addition to the local copies of the blockchain, wherein the block comprises the script and the endorsement responses corresponding to the script. Additionally, the ordering server may send, to the plurality of nodes of the P2P network, the block. Each of the plurality of nodes may be configured to add the block to a corresponding local copy of the blockchain and update a corresponding world state to indicate the script. The AI module may determine, based on the world states indicating the script, one or more software components, of the plurality of software components, for which associated test scripts need to be modified. The AI module may also modify the associated test scripts. The ordering server may further be configured to generate a second block for addition to the local copies of the blockchain, wherein the second block comprises the modified test scripts. The ordering server may then send, to the plurality of nodes of the P2P network, the block. Each of plurality of nodes may be configured to add the second block to the corresponding local copy of the blockchain Various example methods, devices, and systems described herein may facilitate better coordination between various teams involved in software development and testing. A blockchain may provide an immutable record of various development and testing operations performed in a software system. Smart contracts may be integrated into the blockchain to enable dissemination of information associated with script updates across multiple teams, and also seek approval for any new script additions. Further, the use of AI may enable automated detection of other components impacted by updates made to a component and further enable automated development of test scripts for the other components. Decentralization of SDLC management, via blockchain, may ensure that a trusted intermediary is not required between different entities associated with software development and testing. Further, decentralization may ensure that a single node is unable to remove or modify scripts already recorded in the blockchain. The nodes work together to ensure that the blockchain remains trusted and comprises an immutable record of prior operations associated with software development and testing (e.g., addition/modification of scripts, approvals for new scripts/script modification, etc.).

Data records may correspond to any form of data that may be stored in a block. The data records stored in a block may be queried by a node of the P2P system. While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, currency exchange and remittance, P2P transfers, ride sharing, gaming, trading platforms, and real estate, precious metal, and work of art registration and transference, among others.

A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A private blockchain may comprise nodes associated with an enterprise organization and may further include nodes associated with external entities that that the enterprise organization may interact with. In contrast to a fully decentralized blockchain system, some private blockchains use a semi-centralized model that may be more green/environmentally friendly because the trust assumptions are different.

A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Data records in a blockchain may correspond to scripts associated with one or more software components. For example, an enterprise organization may have multiple teams of software developers/testers working on different components of one or more software applications. A network of nodes may be maintained by the enterprise organization to form a decentralized system for software development and testing. The different teams may create and or update scripts associated with the components of a software application. Any new scripts or updates to existing scripts may be added to a blockchain in the form of a transaction. As further described herein, in accordance with smart contracts as deployed on the blockchain, other users connected to the decentralized system may review and endorse the scripts. Based on the endorsements, a new block, comprising the script, may be created. The script may be a development script associated with the components of the software application or a test script (to be used for performing regression testing of the components).

In more detail, a decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations." A smart contract operation, as used herein, may describe one or more operations performed by a "smart contract," which may be one or more algorithms and/or programs associated with one or more nodes within a decentralized P2P network. For example, the one or more algorithms and/or programs may correspond to addition of scripts to a blockchain to or querying of scripts stored in a blockchain. Addition of scripts may correspond to updating of previous versions of the scripts as stored in the blockchain.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

A user may access the decentralized P2P system through a key that serves to uniquely identify the user and enable the user to perform functions related to the decentralized P2P network. Using the key, the user may be able to request network-specific functions related to the decentralized P2P system (e.g., addition of a script to a blockchain, updating of an existing script as stored in the blockchain, etc.). For example, the user may create a script associated with a component of a software application. One or more computing devices forming the decentralized P2P computing system may operate to perform the network-specific functions requested by the user. In performing the network-specific functions, the various computing devices may produce blocks that store the data generated during the performance of the network-specific functions and may add the blocks to a blockchain.

For example, a user may provide a request to the decentralized P2P system to add a new of a script to the blockchain. The script may correspond to an application (e.g., a new component for a feature of the application). One or more of computing devices forming the decentralized P2P computing system may add information associated with the script as a transaction in a transaction pool. Based on the transaction pool, a block may be created and added to the blockchain by the various computing devices of the decentralized P2P computing system. For example, the block may comprise the new script. The new script may be added to the world state associated with the blockchain.

If the user (or another user) wants to submit an updated version of the script, they may provide another request to the decentralized P2P system to add the updated version of the script to the blockchain. Another block may then store the updated version and replace the previous version of the script with the updated version in the world state. The use of a blockchain may enable a node to query the entire history associated with the scripts as submitted to the blockchain. In accordance with well-known properties of a blockchain, records already stored on the blockchain are immutable and any updates made to the records can be tracked (e.g., without losing previously stored information).

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to each of the computing devices comprising server infrastructure 110. The local network connecting auto identification and mapping computing platform 120, system infrastructure 130, and/or post-performance review computing device 140 may interface with network 150 and enable communication with user computing devices 110A-110N.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
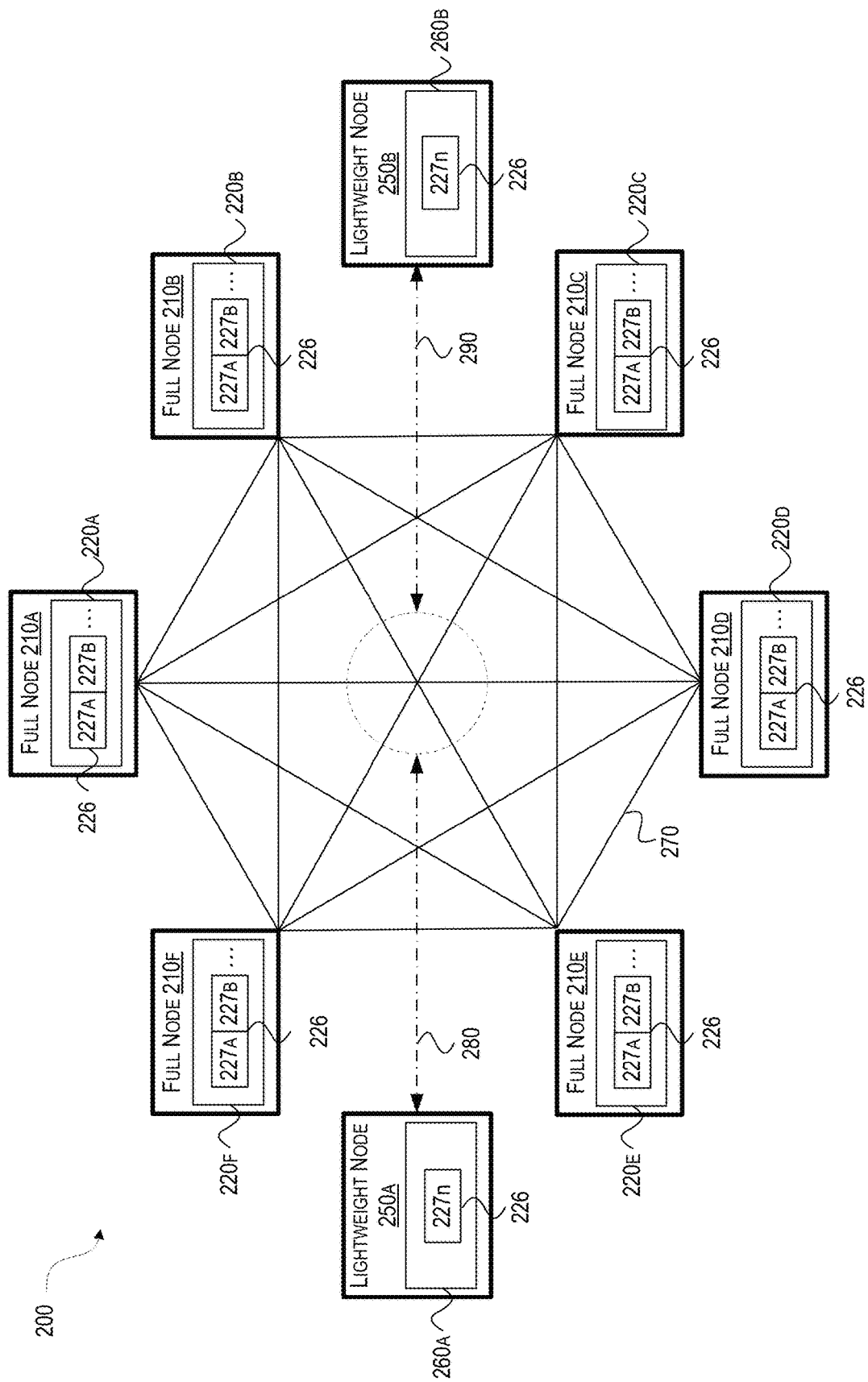
FIG. 2 depicts an illustrative example of decentralized peer-to-peer (P2P) computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and create decentralized P2P network 270. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as smart contract operations, processors of lightweight node computing devices 250A and 250B may execute network commands to broadcast the network functions to decentralized P2P network 270 comprising full node computing devices 210A-210F.

A smart contract operation may correspond to addition/updating of a script (e.g., corresponding to a software component), querying of a script, removal of a script etc. A node (e.g., lightweight node or full node) may send/invoke a smart contract operation to/at one or more other nodes in the decentralized P2P network 270. With reference to the example where the smart contract operation is addition/updating of a script, the one or more other nodes may generate a new block to include the script and update the world state to indicate the script. In this example, the node may send the script when invoking the smart contract operation. With reference to the example where the smart contract operation is addition/updating of a script, the one or more other nodes may generate a new block to indicate deletion of the script and remove the script from the world state. With reference to the example where the smart contract operation is querying of a script, the one or more other nodes may retrieve, from their local blockchains, the script and send the script to the node.

As an example, lightweight node computing device 250B may request a smart contract operation at lightweight node computing device 250A in decentralized P2P network 270. This may entail a dual data transfer between a private/public key associated with lightweight node computing device 250B and a private/public key associated with lightweight node computing device 250A. In doing so, processors of lightweight node computing device 250B may execute network commands to broadcast smart contract operation network function request 290 to decentralized P2P network 270. Smart contract operation network function request 290 may include details about the data transfer (e.g., such as data type, a data transfer amount) to full node computing devices 210A-210F of decentralized P2P network 270 for executing smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. After the new block has been added to blockchain 226, smart contract operation request 290 may be considered to be executed and the data transfer from the private/public key associated with lightweight node computing device 250B to the private/public key associated with the smart contract may be registered.

The smart contract may be configured to hold the data transfer from the private/public key associated with lightweight node computing device 250B until fulfillment of certain predetermined criteria hardcoded into the smart contract is achieved. The smart contract may be configured such that it serves as an intermediate arbiter between entities within the decentralized P2P network 270 and may specify details of a dual data transfer between entities. In an example, a smart contract may be for addition of a script to a blockchain. A request for addition of a script at the lightweight node computing device 250B may initiate a notification to the lightweight node computing device 250A. Based on the notification, the lightweight node computing device 250A may process addition of the script to the blockchain in accordance with the specification of the smart contract.

Lightweight node computing device 250A may also request a smart contract operation related to blockchain 226 in decentralized P2P network 270, which may conclude the dual data transfer between a private/public key associated lightweight node computing device 250A and a private/public key associated with lightweight node computing device 250B. Processors of lightweight node computing device 250A may execute network commands to broadcast the smart contract operation network function request 280 to decentralized P2P network 270. The smart contract operation network function request 280 may include details about the data transfer to full node computing devices 210A-210F of decentralized P2P network 270 for executing the smart contract operation network function request. The smart contract operation network function request 280 may further include the public key associated with the smart contract. Processors of lightweight node computing device 250A may execute digital signature algorithms to digitally sign the smart contract operation network function request 280 with the private key associated with lightweight node computing device 250A.

At decentralized P2P network 270, the smart contract operation network function request 280 may be broadcasted to each of full node computing devices 210A-210F through execution of network protocols by full node computing devices 210A-210F. In order to execute the smart contract operation network function request 280 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request 280. The resultant digest of the smart contract operation network function request 280, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request 280 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. After the new block has been added to blockchain 226, the smart contract operation transaction network function request 290 may be considered to be executed and the data transfer from the private/public key associated with lightweight node computing device 250A to the private/public key associated with the smart contract may be registered.

When the smart contract receives the data value from each of lightweight node computing device 250A and lightweight node computing device 250B, the smart contract may transfer the data value from lightweight node computing device 250A to lightweight node computing device 250B and the data value from lightweight node computing device 250B to lightweight node computing device 250A.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3B:
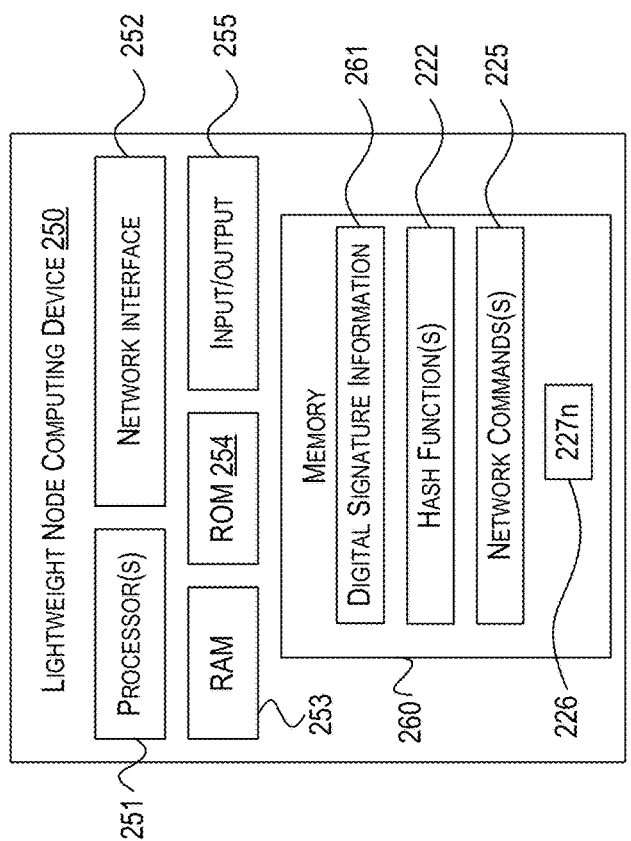
FIG. 3B depicts an illustrative example of a lightweight node computing device that may be used in accordance with one or more illustrative aspects described herein.
Figure 3A:
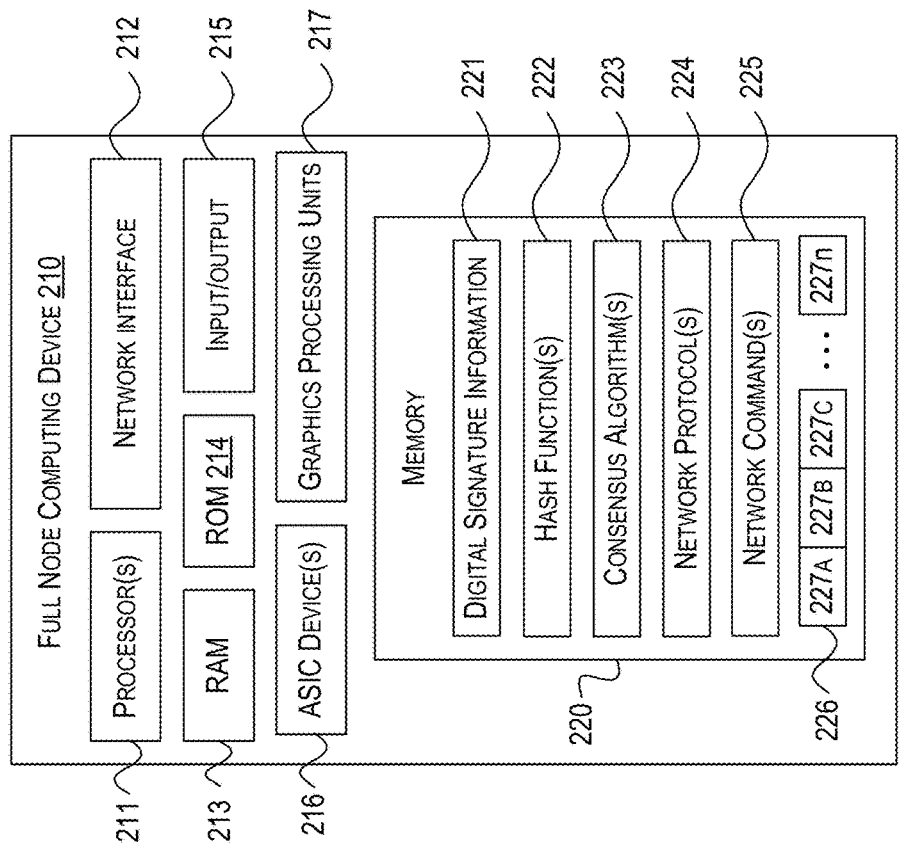
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, and the like), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software, and the like.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, and the like), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Figure 4:
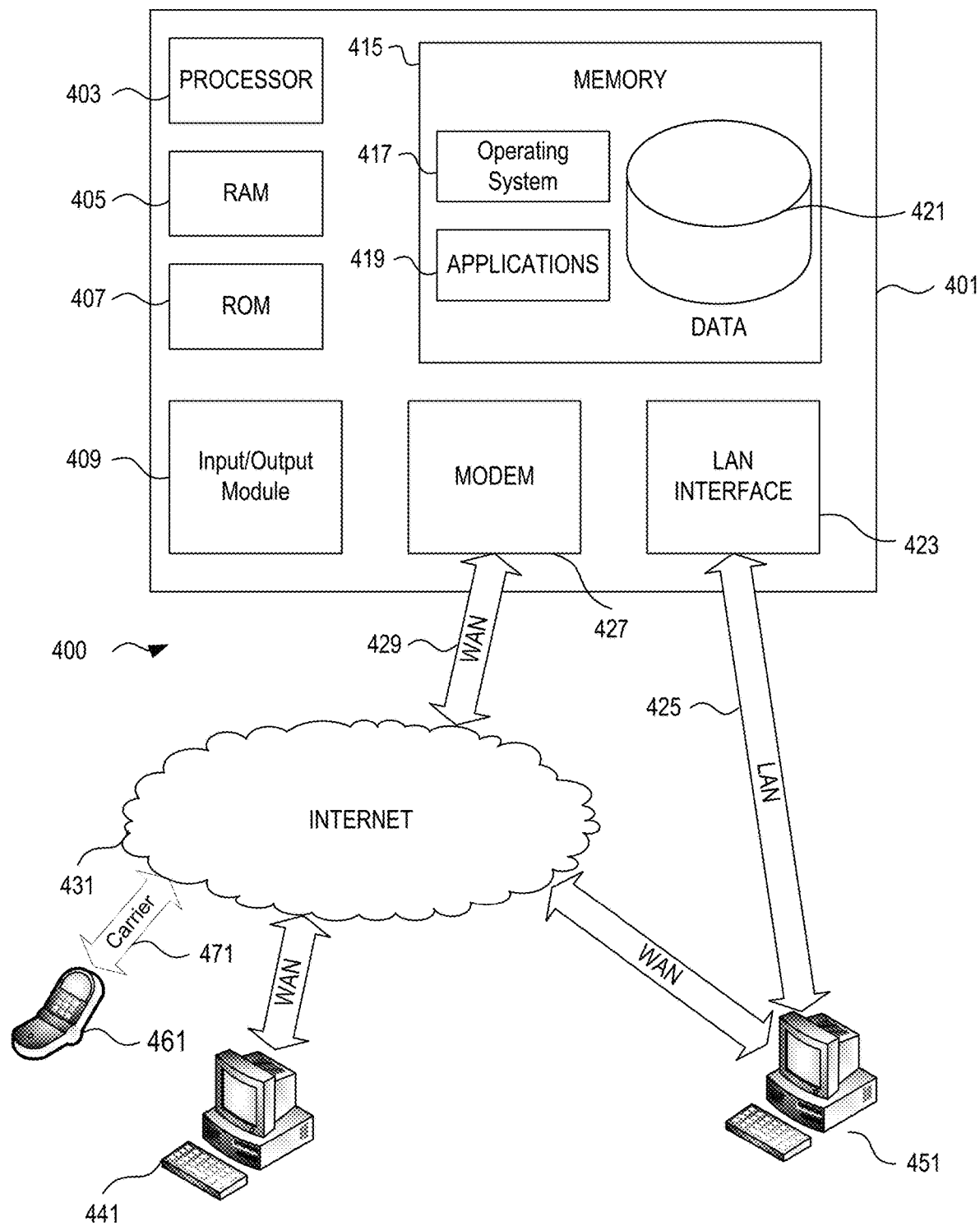
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium. In an example, an ordering server and/or an AI module may correspond to the computing device 401. A computer-readable medium (e.g., ROM 407) may store instructions that, when executed by the processor 403, may cause the computing device 401 to perform the functions of the ordering server and/or the AI module as described herein.

Figure 5:
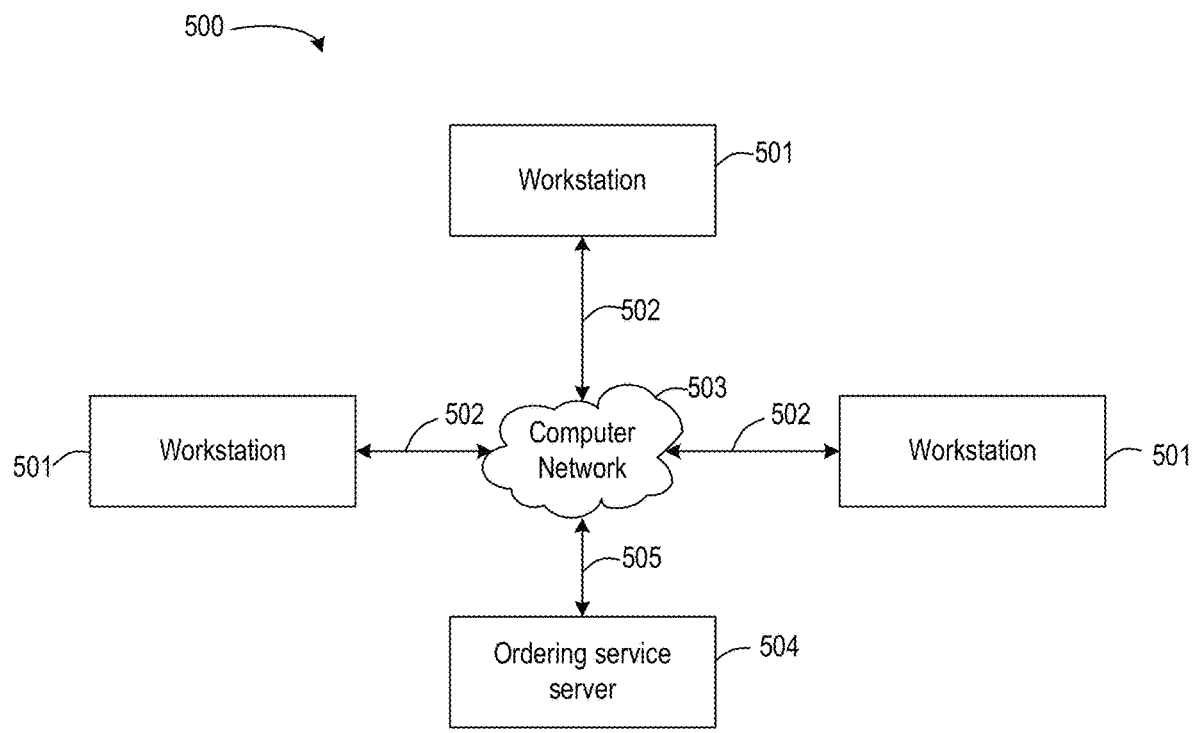
FIG. 5 depicts an illustrative example of a system in accordance with one or more illustrative aspects described herein.

Referring to FIG. 5, an illustrative system 500 for implementing example embodiments according to the present disclosure is shown. As illustrated, system 500 may include one or more workstation computers 501. Workstations 501 may be local or remote, and may be connected by one of communication links 502 to computer network 503. In system 500, an ordering server 504 may comprise any suitable server, processor, computer, or data processing device, or combination of the same. The ordering server 504 may be used to process the instructions received from, and the transactions entered into by, one or more participants.

Computer network 503 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 502 and 505 may be any communication links suitable for communicating, such as network links, dial-up links, wireless links, and hard-wired links.

The steps that follow in the Figures may be implemented by one or more of the components in FIGS. 4 and 5 and/or other components, including other computing devices.

In some aspects, other forms of communications via one or more of communication links can include multi-lateral private message communications. As an example, if a "51%" blockchain problem is anticipated such that a single blockchain user could obtain control of a majority or a near majority of the blockchains in a network in a manner that could render the network vulnerable, one or more of the above communication links can use multi-lateral private messages to communicate sensitive data. Upon a determination that the threat of an attack has been eliminated, the communications can return to using blockchains. Examples of communications and monitoring for preventing such an attack are described below regarding FIG. 6.

By using blockchain nodes/distributed ledgers, information can be communicated in a secure and transparent manner based on blockchain technology described above regarding FIGS. 1, 2, and 3. Blockchain nodes/distributed ledgers have advantages over other forms of communicating data, including, e.g., advantages of immutability, security, traceability, and recovery, described further below.

Immutability refers to something that is unchanging over time, or unable to be changed. In aspects of the disclosure, once data is written to a blockchain, that data cannot be changed—not even by a system administrator or other person having a high level of access. Communicating data via blockchains, as described herein, provides immutability that is particularly advantageous from audit and compliance perspectives relevant to financial transactions. A provider of data that communicates using blockchains as disclosed herein can prove that the data has not been altered. Similarly a recipient of data communicated via blockchains as disclosed herein can be assured that the data has not been altered.

Security is at a very high level with respect to blockchain based communications disclosed herein. By communicating financially sensitive information via blockchain nodes/distributed ledgers, as described herein, this information can be transferred and stored in a highly secure manner.

Traceability is another advantage of blockchain based communications disclosed herein. As examples, transaction audit logs and other traceability features of blockchain based communications disclosed herein provide support for preservation of information and transparency of transactions. As an example, if a party wants to determine any changes made to an agreement, or wants to return to a previous agreement or information, the prior data of the blockchain is readily available and traceable to do so.

Data recovery can be an advantageous feature of blockchain based communications disclosed herein. As described herein, a plurality of blockchain nodes can each maintain a copy of blockchain distributed ledgers in a network.

Decentralization, as enabled by a P2P network enables trust in the system as it does not require any third-party to mediate between multiple nodes involved in script development. Scripts stored in a blockchain are hard to revise and tamper. The blockchain may serve as an immutable and trusted ledger that records and validates every operation during script development and testing. Use of signatures may ensure that only authorized users (with a valid key) can initiate/update transactions associated with addition/updating of scripts. Further, the inclusion of smart contracts may provide support for implementing rules for script validation and release to testing/production environments as programmable scripts. Encryption may be used to restrict access to data stored (e.g., scripts) in blockchain (which is otherwise available to all nodes) to participants who have the privileges.

Figure 6:
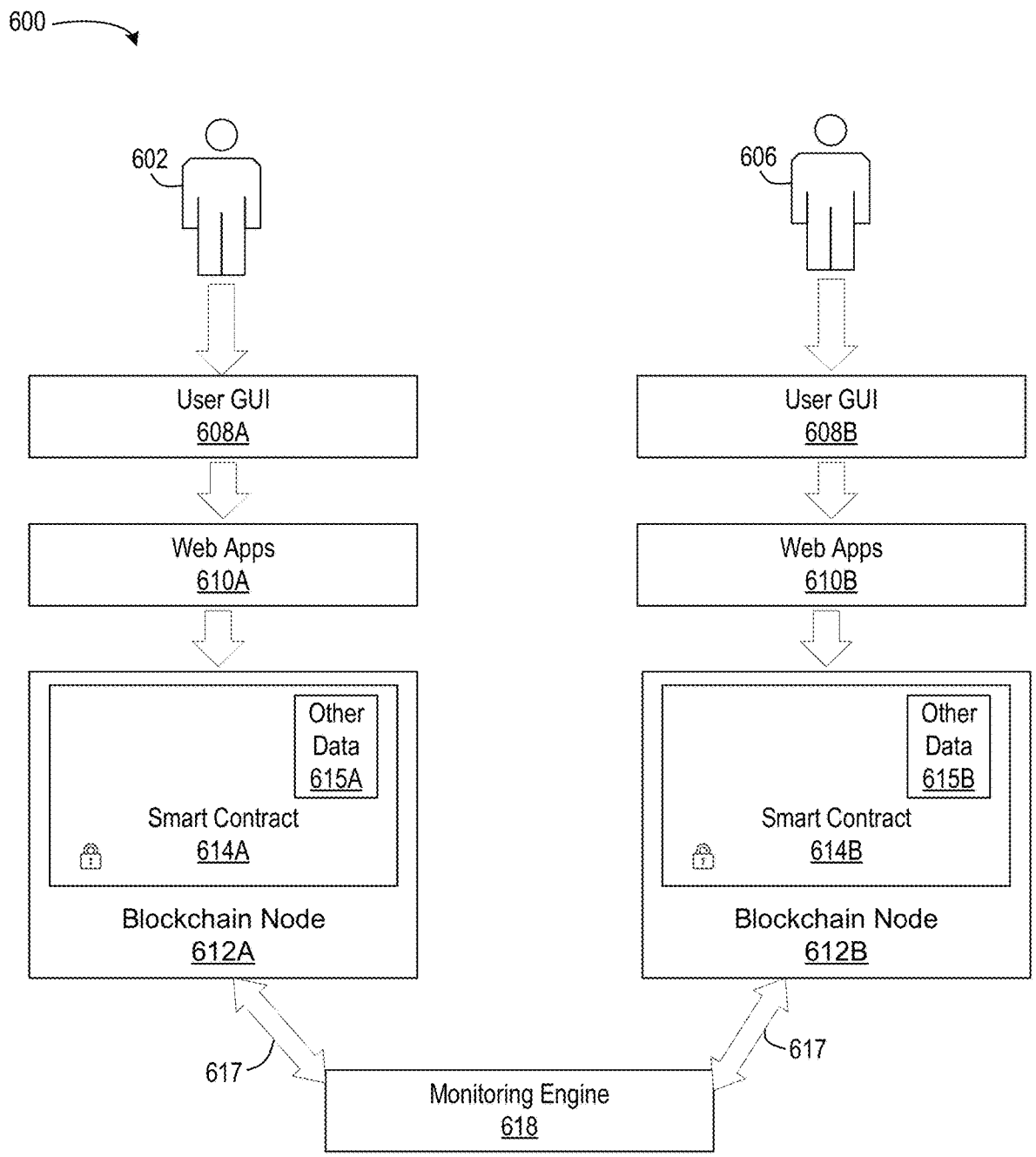
FIG. 6 depicts an illustrative example of a high-level system diagram for a blockchain based system in accordance with one or more illustrative aspects described herein.

FIG. 6 provides additional examples of aspects of the present disclosure relating to blockchain-based shared contracts that may be implemented by one or more of the components in FIGS. 2-5 and/or other components, including other computing devices. FIG. 6 depicts a plurality of users 602 and 606 in a system 600 for sharing smart contracts 614A and/or 614B among a plurality of blockchain nodes 612A and 612B. While only two blockchain nodes 612A and 612B are shown, system 600 can include any number of blockchain nodes across a network. In some examples, user 602 may correspond to user associated with a first product development team or a testing team in FIG. 7, or any other user described herein. User 606 could correspond to another user (e.g., associated with another product development team) and may be able to access certain data as input by the user 602. Users 602 and 606 may correspond to users with the same or different access rights to the blockchain. For example, user 602 may input scripts or modifications of existing scripts for processing by various nodes/users. For example, the script may be associated with a component of an application being jointly developed and tested by multiple product development teams or testing teams in an enterprise organization. User 606 may correspond to a user who may be able to access/validate the script as input by the user 602 in accordance with a smart contract involving the blockchain nodes 612A and 612B. For example, the user 606 may review the information input by the user 602 and approve the script for inclusion in the application. Any number of users may be provided with respective one or more various types of levels of access of data in system 600.

Each user 602 and 606 can communicate in system 600 via respective user graphical user interfaces (GUIs) or other form of interface, such as GUI 606A (e.g., by user 602) and GUI 608B (e.g., by user 606). The GUIs 608A and 608B can operate in connection with one or more applications, such as respective Web applications ("Web Apps") 610A and 610B. Users 602 and 606 can use a Web App 610A and 610B, via a respective User GUI 608A and 608B in a computer device, such as computing device 401 described above, to communicate regarding a smart contract 614A and/or 614B stored at a respective blockchain node 612A and/or 612B. User 602 and 606 may use the one or more applications to submit scripts to the blockchain and/or approve scripts submitted by the other users. In accordance with various examples described herein, the one or more applications may invoke smart contracts for execution at other nodes of the P2P network. The smart contracts may enable the other nodes to access and review submitted scripts. The smart contract can be stored in a blockchain node 612A, which can include, e.g., a blockchain node storing blockchain distributed ledgers described above regarding FIG. 6. In addition, a copy of the smart contract 612A can be stored as smart contract 614B in blockchain node 612B.

System 600 can optionally include a monitoring engine 618 in communication with blockchain nodes 612A and 612B via communication links 617. Monitoring engine 618 can be located at any location in a network, including, e.g., in a cryptography machine learning enabled blockchain based apparatus described herein or remote therefrom. Monitoring engine 618 can be used to monitor communications between blockchain nodes throughout a network, including, e.g., blockchain nodes 612A and 612B. As examples, monitoring engine 618 can be used to detect and prevent a "51%" attack such as described above. In some embodiments, monitoring engine 618 can determine whether a party has control of within a threshold amount of blockchains, such as 40%, 45%, 46%, 49%, 50%, or 51%. If control of 50% or more of blockchain in a network by one party is detected, one or more communication links such as described above, e.g., regarding FIG. 6, can switch from using blockchains to using multi-lateral private messages for communications of sensitive data. Similar operations can be performed if control of a threshold amount below 50% (e.g., 49%, 46%, 45%, 40%) of blockchains by one party is detected so as to prevent a "51%" attack. As another example, if monitoring engine 618 detects one party, or a number of related parties, obtains or appears to attempt to obtain a threshold amount of blockchains that could lead to a "51%" or similar attack on the blockchain network, additional monitoring can be performed, such as increasing frequency of monitoring activities or adjusting to an increased level of security, e.g., using permissioned blockchains. If at any point in time a "51%" attack is anticipated or detected, any of the blockchain communications described herein can be switched, either permanently or temporarily, to using multi-lateral private messages for communications. If a threat subsides, multi-lateral private messages for communications can return to blockchain communications.

Figure 7A:
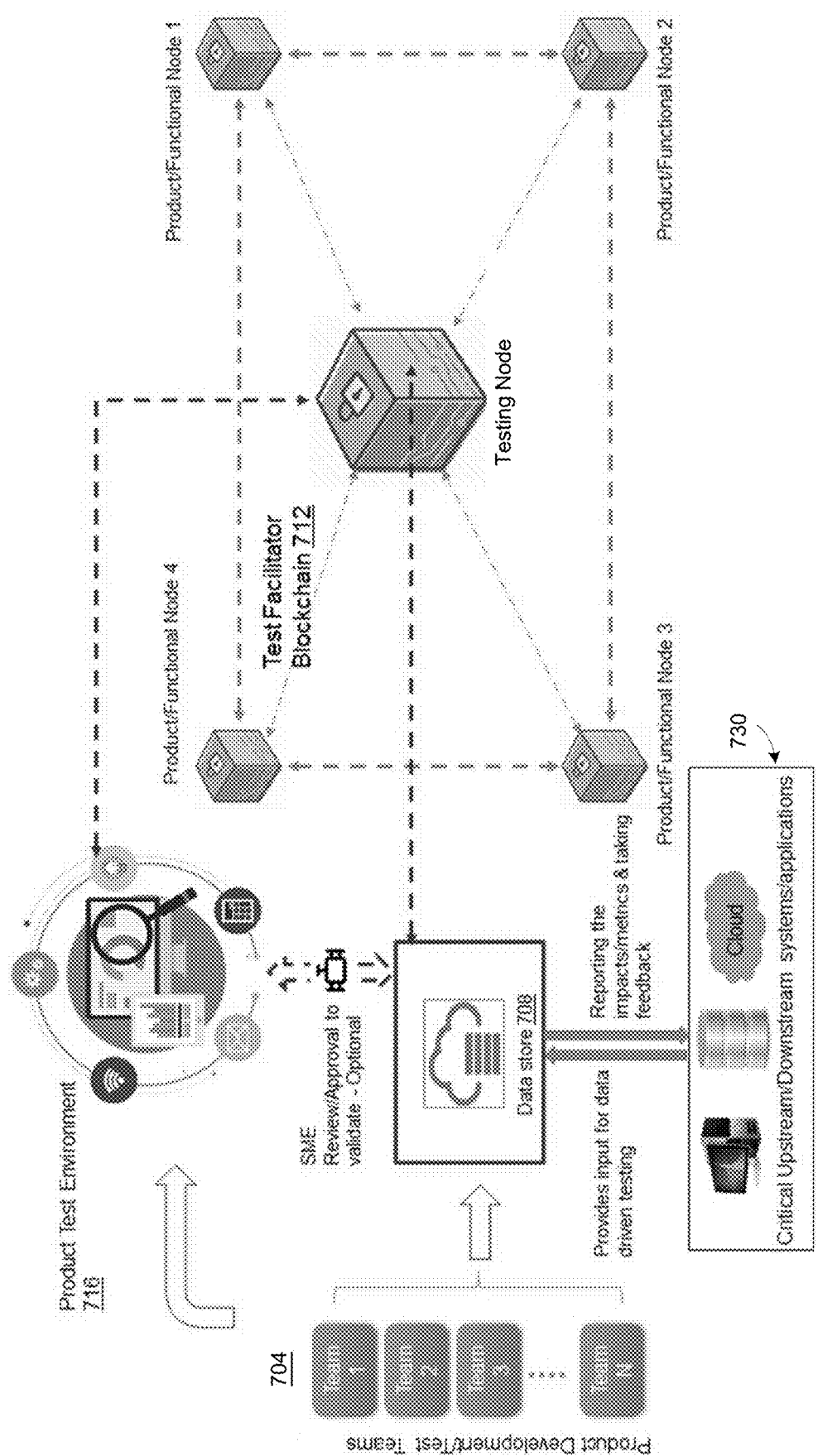
FIG. 7A depicts an example architecture for submission of scripts into a blockchain and validation of the scripts by nodes of a P2P network in accordance with one or more illustrative aspects described herein.

FIG. 7A shows an example architecture 700 for submission of scripts into a blockchain and validation of the scripts by nodes of a P2P network. The example architecture may be implemented at an enterprise organization that comprises a plurality of product development/test teams 704 involved in development and testing of different components of a software application. In an example, the enterprise organization may be a banking services enterprise and the software application may correspond to an application enabling clients to access details associated with their banking accounts (e.g., via a web interface). The software application may have multiple software modules, each dedicated to a different component/service of the software application. For example, the different components may correspond to web user interface (UI) of the application as provided by a web server, backend processing functions at an application server, database entry and retrieval functions, etc.

Each module may have one or more product development/test teams 704 responsible for development and maintenance of scripts associated with the module. In an example, team 1 may be associated with development of the UI for the application, team 2 may be associated with development of backend processing services performed by the web server, team 3 may be associated with development of services for data entry and retrieval from databases, etc. In addition, a dedicated testing team may be responsible for development of test scripts for testing various modules developed by the other teams The data store 708 may store scripts submitted by the different teams. For example, the data store 708 may store scripts associated with the different modules of the application as well as test scripts (e.g., for regression testing of the different modules). The scripts may be released to a product test environment for periodic testing and debugging. Data-driven testing may be employed for which test data may be obtained from upstream/downstream systems and/or applications 730.

A test facilitator blockchain 712 may be used to store records of various scripts as submitted by the product development/test teams 704. The test facilitator blockchain 712 may be associated with a P2P network comprising a plurality of nodes. Each of the teams may be associated with a node of the P2P network. For example, team 1 may be associated with product/functional node 1, team 2 may be associated with product/functional node 2, team 3 may be associated with product/functional node 3, etc. The testing team may be associated with a centralized testing node. The different nodes may combine to maintain a test facilitator blockchain 712. The test facilitator blockchain 712 may store a record of scripts submitted by the teams. The test facilitator blockchain 712 may interface with the data store 708 to enable the product test environment to retrieve scripts for testing purposes at the product test environment 716. Users associated with the teams may submit scripts for inclusion into the test facilitator blockchain 712. As further described herein, the test facilitator blockchain 712 may further store smart contracts between the different teams. Submission of scripts for inclusion into the test facilitator blockchain 712 may invoke the smart contracts for execution at the nodes. Based on execution of the smart contracts, the teams may validate a submitted script for inclusion into the test facilitator blockchain 712/data store 708.

Each of the individual product/functional nodes may also have local copies of the test facilitator blockchain 712. The data store 708 may correspond to a centralized database of scripts which may be updated based on validation of the scripts and consensus of the local copies of the test facilitator blockchain 712. In an example, the data store 708 may correspond to a world state associated with the test facilitator blockchain 712. The world state may store the latest versions of the scripts as agreed upon by the different nodes.

Figure 7B:
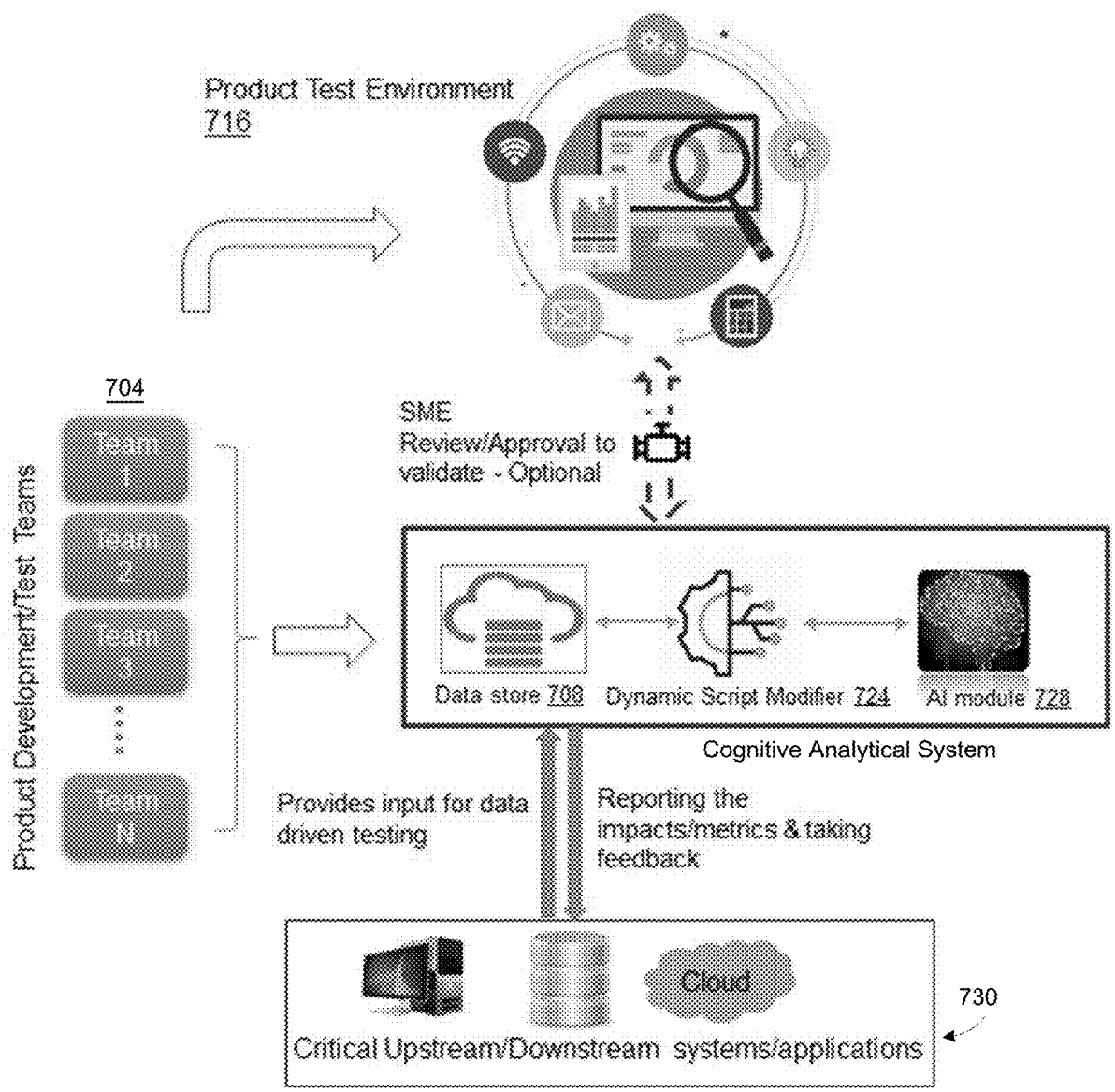
FIG. 7B depicts an example architecture for artificial intelligence (AI)-based generation and dynamic modification of test scripts in accordance with one or more illustrative aspects described herein.

FIG. 7B shows an example architecture 720 for AI-based generation and dynamic modification of test scripts. The example architecture 720 may use a dynamic script modifier 724 in conjunction with an AI module 728 for generation and modification of test scripts. The cognitive script modifier 724 and the AI module 728 may together form a cognitive analytical system.

As described with reference to FIG. 7A, product development/test teams 704 may submit scripts for inclusion into the data store 708. The scripts may correspond to newly added code blocks to existing scripts stored in the data store 708, and/or modification and/or removal of existing code blocks/scripts stored in the data store 708. The AI module 728 may determine new code block additions and/or modification/removal of code blocks/scripts. The AI module 728 may further predict modules that may be impacted based on code block addition, modification, and/or removal based on one or more unsupervised machine learning algorithms (e.g., using artificial neural network, K-means algorithm, association rule learning, etc.). Prediction of an impacted module may be based on linkages between a module (associated with the code block) and other modules and/or determined similarity indices between module and other modules. For example, team 3 may update a code block related to retrieval of data from a database. However, this update may impact scripts associated with backend processing performed at an application server. The AI module 728 may determine, based on the code block update, that the module associated with backend processing is an impacted module.

The AI module 728 may further determine modified test scripts of impacted modules and/or new test scripts that may need to be added for the impacted modules. The AI module 728 may determine the modified/new test scripts based on identified transformation logic changes (of existing scripts) and requirement mappings by building learned functions using supervised machine learning. In an example, the learned functions may be built based on correlation between existing available test scripts and scripts of the modules of the software application using supervised machine learning models (e.g., using decision tree/random forest, naive Bayes classifier, k-nearest neighbors (KNN) algorithm, support vector machines (SVM), etc.). A dynamic script modifier 724 may modify the identified test scripts and/or add the new test scripts. Further, the test scripts may be modified/added based on tracking central processing unit (CPU) and memory usage in the product test environment. In this manner, the AI module 728 may determine the most efficient manner for testing new code blocks and or changes to existing code blocks.

Figure 7C:
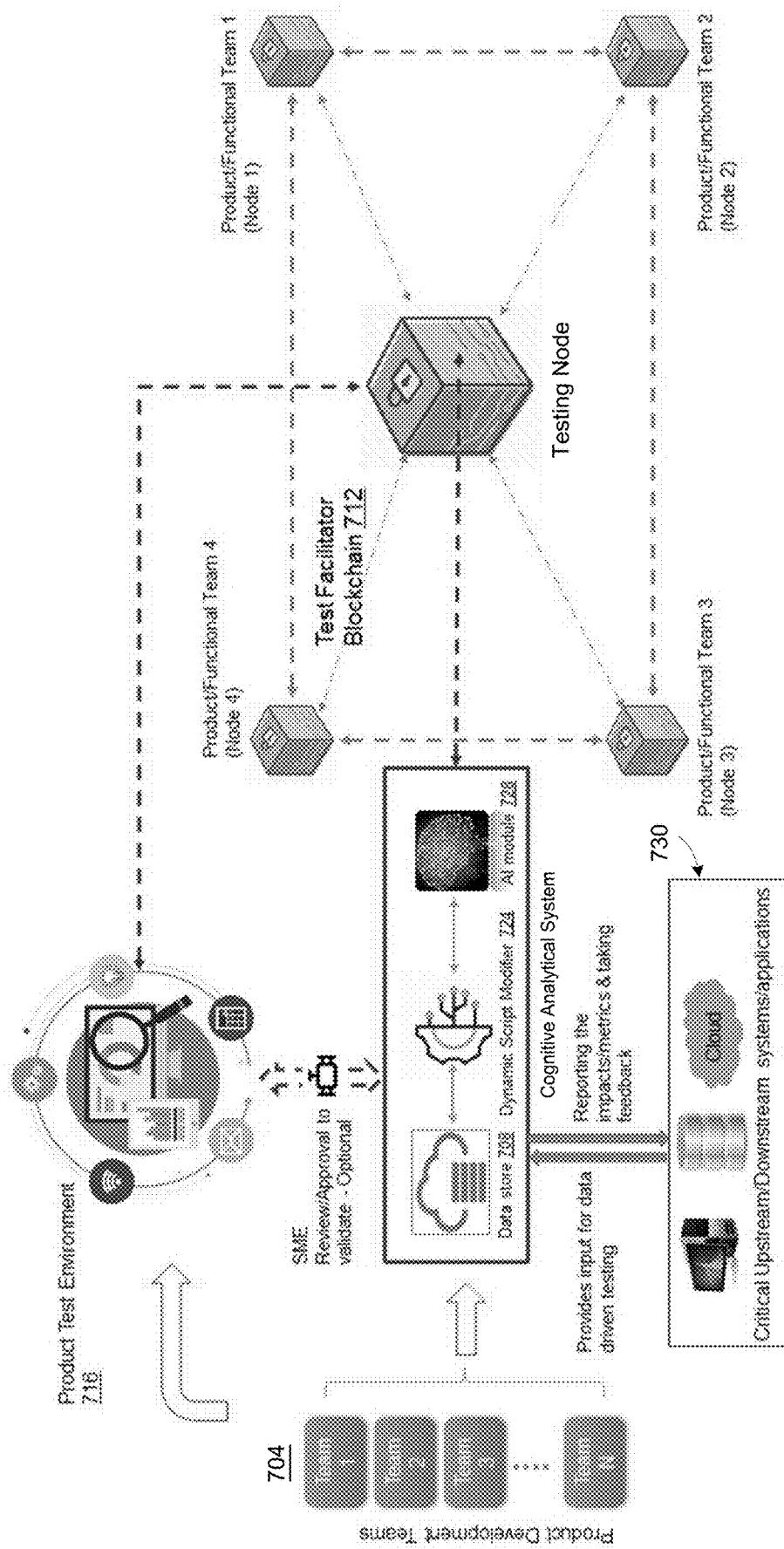
FIG. 7C shows an example architecture that combines a test facilitator blockchain with a cognitive analytical system in accordance with one or more illustrative aspects described herein.

FIG. 7C shows an example architecture 740 that combines a test facilitator blockchain 712 with a cognitive analytical system. The test facilitator blockchain 712 may store a record of added scripts. The cognitive analytical system may use the AI module 728 to determine modified test scripts and/or new test scripts in accordance with the procedures described with reference to FIG. 7B. The modified test scripts and/or new test scripts may be stored in the blockchain and/or the data store 708 for use in the product test environment 716.

Figure 8B:
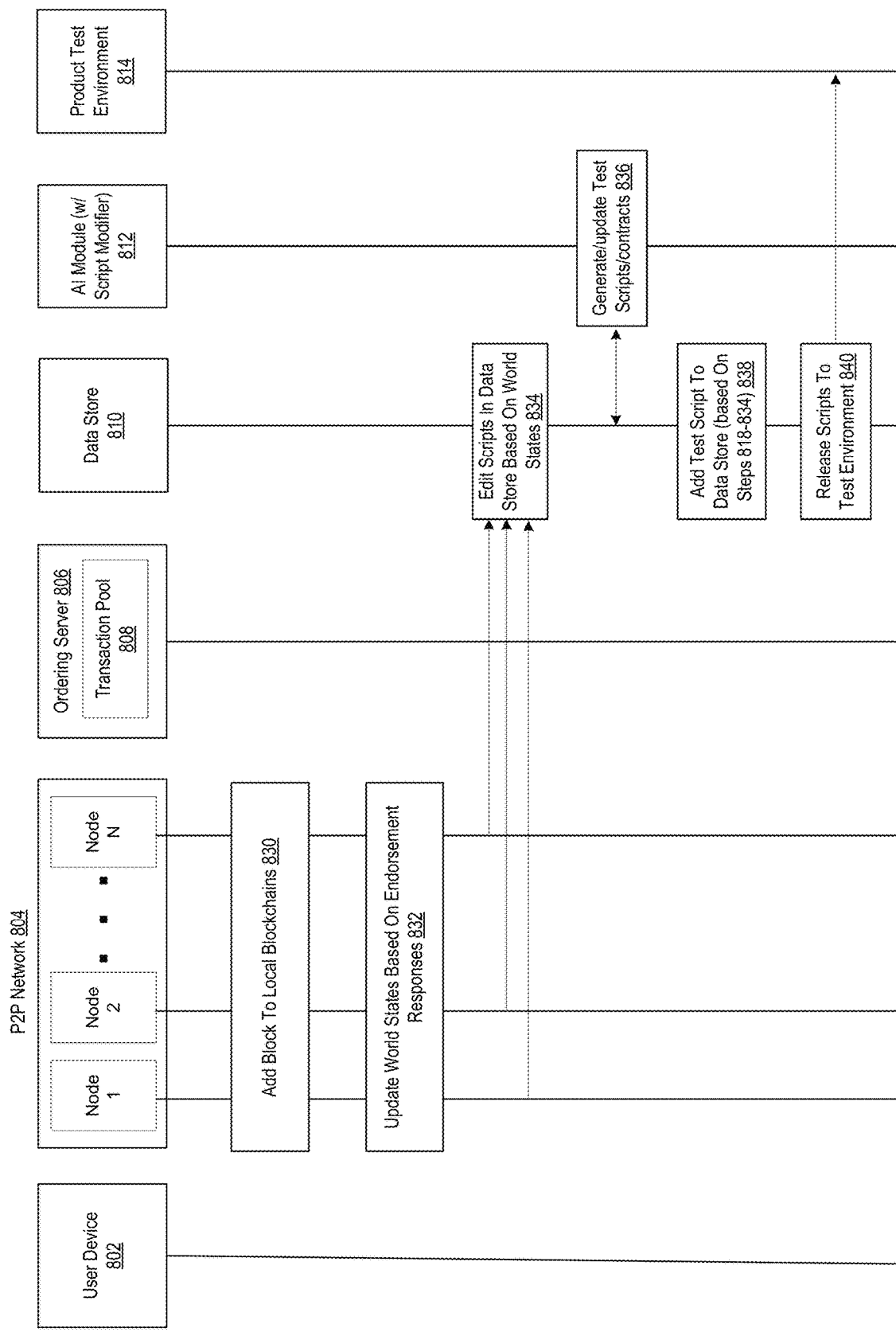

FIGS. 8A and 8B shows an example event sequence for script submission, validation, and/or test script generation in accordance with one or more example embodiments described herein. A P2P network 804 may comprise a plurality of nodes (e.g., node 1, node 2 . . . node N) storing a shared ledger (in the form of a blockchain) of scripts (e.g., scripts corresponding to modules of an application as submitted by one or more users, test scripts submitted by the one or more user, test scripts generated by an AI module). The scripts may be associated with an application being co-developed by various teams that are linked via the nodes of the P2P network. Each of the nodes may correspond to a team associated with a module of the application, and each of the teams may comprise multiple users. For example, node 1 may correspond to a team associated with development of a UI module of the application, node 2 may correspond to a team associated with development of scripts related to a backend service module, node 3 may correspond to a team associated with development of scripts for a database management module, node 4 may be associated with a team for development of test scripts related to the application, etc.

Each of the nodes may store a corresponding local copy of the blockchain and a corresponding local copy of a world state associated with the blockchain. Consensus mechanism enabled by an ordering server 806 may enable the local copies of the blockchain to be consistent with one another. User device (e.g., a user device 802, or any other device) may be associated with a node of the P2P network 804 and may communicate with one or more nodes to query scripts, submit new scripts, and/or modify existing scripts as stored in the blockchain.

At step 816, the user device 802 may send a script to one or more nodes of the P2P network 804. The script may be a new version of an existing script in the blockchain. The script may be a new script associated with the application. The script may be a new code block or a revised version of an existing code block of a module associated with the application. In an example, the user device 802 may further send the script to the ordering server 806. In an example, the user device 802 may send the script to the ordering server 806 which may forward the script to one or more nodes of the P2P network 804. In an example, the ordering server 806 may itself be a node of the P2P network 804.

Smart contracts between the nodes may be used to determine the one or more nodes of the P2P network 804 to which the script is to be sent. For example, the user device 802 may be associated with node 3 corresponding to a team associated with development of scripts for database management module. A smart contract may be defined involving nodes 3, 4, 5, and 6 and stored in the blockchain. Submission of a script by a user associated with any one of the nodes 3, 4, 5, 6 may invoke execution of a smart contract at other nodes associated with the smart contract. Execution of the smart contract may allow users associated with those nodes to view the script. Thus, in accordance with the smart contract, submission of the script at the user device 802 associated with node 3 may result in user devices associated with nodes 4, 5, and 6 to view the script. The smart contract may further be associated with an endorsement policy that defines conditions based on which the script may be categorized as valid or invalid. For the smart contract involving nodes 3, 4, 5, and 6, for example, the endorsement policy may define that a majority of nodes must identify a submitted script as valid for the script to be written into a world state associated with the blockchain.

In another example, an AI module/engine 812 may be used to determine the one or more nodes of the P2P network 804 to which the script is to be sent. For example, as described with reference to FIG. 7B, the AI module 812 may determine modules that may impacted by the script as submitted by the user device 802. The AI module 812 may receive the script, from the user device 802, and send an indication of the determined modules to the user device 802 or the ordering server 806. The user device 802 or the ordering server 806 may send the script to nodes corresponding to teams responsible for the determined modules. In an example, the AI module 812 may update the smart contract to indicate the determined one or more nodes.

At step 818, the one or more nodes of the P2P network may view the script. For example, the one or more nodes may execute a smart contract to access the script submitted by the user device 802. Execution of the smart contract may also enable the one or more nodes to query previous versions of the script (if present) from the blockchain. For example, users associated with the one or more nodes may review the script (and the previous versions of the script) and determine whether the script is valid or invalid (e.g., whether to approve or reject the script). User devices associated with one or more nodes may send endorsement responses, to the ordering server 806, indicating whether the script is valid (approved) or invalid (rejected). In an example, when the node 3 submits the script, nodes 4 and 5 may send endorsement responses indicating that the script is valid, but node 6 may send an endorsement response indicating that the script is invalid. In an example, at least some of the one or more nodes need not respond with an endorsement response. For example, the smart contract may indicate the nodes which need not provide an endorsement response.

At step 820, the ordering server 806 may generate a transaction comprising the script and the received endorsement responses. The transaction may be added to a transaction pool 808 for block generation. At step 824, the ordering server 806 may generate a block based on the transactions stored in the transaction pool. In accordance with well known protocols for blockchains, the new block may comprise a hash value of an immediately preceding block of the blockchain. In some situations where the script may need to be kept secret, only a proof of existence of the script may be placed in the block and non-interactive zero-knowledge proof protocols may be used.

At step 828, the ordering server 808 may broadcast the generated block to all of the nodes of the P2P network 804. At step 830, the nodes of the P2P network 804 may add the block to corresponding local copies of the blockchain. The nodes may then validate the transactions as included in the block. Validating a transaction in the block may comprise determining endorsement responses included for a script in the transaction. The nodes may determine the transaction to be valid, for example, if a majority of the one or more nodes to which the script was sent (at step 816) indicated that the script was valid. With reference to above example where nodes 4 and 5 send endorsement responses indicating that the script is valid (e.g., approved), but node 6 sends an endorsement response indicating that the script is invalid (e.g., rejected), the nodes may determine that the transaction is valid. The nodes may determine the transaction to be invalid, for example, if a majority of the one or more nodes to which the script was sent (at step 816) indicated that the script was not valid (e.g., rejected).

At step 832, and if the transaction is determined to be valid, the nodes may add the script indicated in the transaction to the corresponding local copies of the world state. In an example where the script is an updated version of a previous script, the previous version of the script may be removed from the world state and the new version of the script may be added to the world state. In an example where the script is a new script, the new script may be added to the world state. If a transaction is determined to be invalid, the script may not be added to the world state.

A data store 810 may be repository of scripts associated with the application and agreed upon by the nodes based on the protocols described above. In an example, the ordering server 806 may store the script to the data store 810 if the nodes to which the block was sent (at step 828) determine that the transaction was valid and add the script indicated in the transaction to the corresponding local copies of the world state. In an example, the data store 810 may query the world state and any changes in the world state may be reflected in the data store (step 834). In an example, the ordering server 806 may store the script to the data store 810 if a majority of the one or more nodes to which the script was sent (at step 816) indicated that the script was valid (via endorsement responses). The blockchain may store smart contracts that invoke automated execution of test script(s) in a product test environment 814 based on addition of scripts to the world state/data store 810.

At step 836, the AI module 812 may revise existing test script(s) and/or determine new test script(s) based on addition of the script to the world state/data store 810. The test script(s) may be for a module associated with the script. The AI module 812 may determine (e.g., as described with reference to FIG. 7B) other module(s) of the application that may be impacted by the addition of the script. The test script(s) may be for the impacted modules.

For example, if the script is for the database management module, the AI module 812 may revise/add test script(s) for the database management module. Further, the AI module 812 may determine that the backend services module is also impacted by the addition of the script to the world state/data store 810. Therefore, the AI module 812 may revise/add test script(s) for the backend service module as well.

In an example, the AI module 812 may itself be associated with a node of the P2P network 804. The AI module 812 may send the revised/new test script(s) to one or more other nodes of the P2P network 804 for validation. Based on the procedures described with reference to steps 818-834, the test script(s) may be added to the data store 810 (step 838). At step 840, the scripts in the data store 810 may be released to the product test environment 814. The product test environment 814 may comprise one or more servers for testing the different modules of the application using various test scripts.

Figure 9:
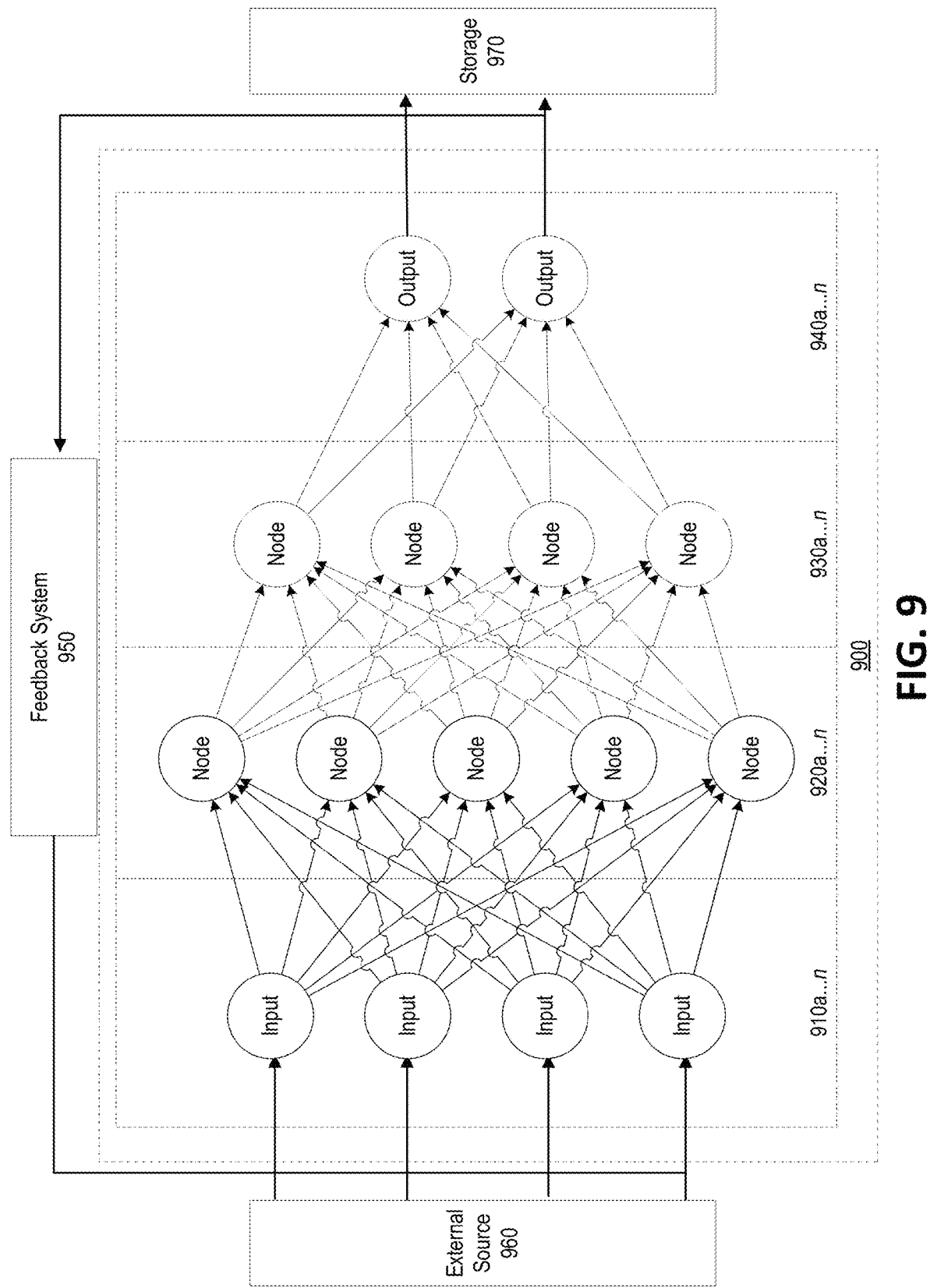
FIG. 9 depicts a simplified example of an artificial neural network on which a machine learning algorithm may be executed in accordance with one or more illustrative aspects described herein.

FIG. 9 illustrates a simplified example of an artificial neural network 900 on which a machine learning algorithm may be executed. The machine learning algorithm may be used at the AI-based performance monitoring module as described herein. FIG. 9 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 900 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "95% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 9, each of input nodes 910a-n is connected to a first set of processing nodes 920a-n. Each of the first set of processing nodes 920a-n is connected to each of a second set of processing nodes 930a-n. Each of the second set of processing nodes 930a-n is connected to each of output nodes 940a-n. Though only two sets of processing nodes are shown, any number of processing nodes may be implemented. Similarly, though only four input nodes, five processing nodes, and two output nodes per set are shown in FIG. 9, any number of nodes may be implemented per set. Data flows in FIG. 9 are depicted from left to right: data may be input into an input node, may flow through one or more processing nodes, and may be output by an output node. Input into the input nodes 910a-n may originate from an external source 960. The input from the input nodes may be, for example, a new script or a revised script as submitted by a node of a P2P network (e.g., the P2P network 804). Output may be sent to a feedback system 950 and/or to storage 970. The output from an output node may be an indication of modules impacted based on the submitted script and/or new/revised test scripts (e.g., for regression testing). The feedback system 950 may send output to the input nodes 910a-n for successive processing iterations with the same or different input data.

In one illustrative method using feedback system 950, the system may use machine learning to determine an output. The output may include one or more of: determined transfer channel(s), expected wait times, threshold queue lengths, threshold times, predicted expected handshake wait times, threshold customer satisfaction scores, confidence values, operation status of transfer channels, predicted expected usage costs, classification output, and/or the like. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tan h function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 9 depicts nodes that may perform various types of processing, such as discrete computations, computer programs, and/or mathematical functions implemented by a computing device. For example, the input nodes 910a-n may comprise logical inputs of different data sources, such as one or more data servers. The processing nodes 920a-n may comprise parallel processes executing on multiple servers in a data center. And, the output nodes 940a-n may be the logical outputs that ultimately are stored in results data stores, such as the same or different data servers as for the input nodes 910a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 900 may learn and/or be dynamically reconfigured. Though nodes are depicted as having connections only to successive nodes in FIG. 9, connections may be formed between any nodes. For example, one processing node may be configured to send output to a previous processing node.

Input received in the input nodes 910a-n may be processed through processing nodes, such as the first set of processing nodes 920a-n and the second set of processing nodes 930a-n. The processing may result in output in output nodes 940a-n. As depicted by the connections from the first set of processing nodes 920a-n and the second set of processing nodes 930a-n, processing may comprise multiple steps or sequences. For example, the first set of processing nodes 920a-n may be a rough data filter, whereas the second set of processing nodes 930a-n may be a more detailed data filter.

The artificial neural network 900 may be configured to effectuate decision-making. As a simplified example for the purposes of explanation, the artificial neural network 900 may be configured to detect faces in photographs. The input nodes 910a-n may be provided with a digital copy of a photograph. The first set of processing nodes 920a-n may be each configured to perform specific steps to remove non-facial content, such as large contiguous sections of the color red. The second set of processing nodes 930a-n may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 900 may then predict the location on the face. The prediction may be correct or incorrect.

The feedback system 950 may be configured to determine whether or not the artificial neural network 900 made a correct decision. Feedback may comprise an indication of a correct answer and/or an indication of an incorrect answer and/or a degree of correctness (e.g., a percentage). For example, in the facial recognition example provided above, the feedback system 950 may be configured to determine if the face was correctly identified and, if so, what percentage of the face was correctly identified. The feedback system 950 may already know a correct answer, such that the feedback system may train the artificial neural network 900 by indicating whether it made a correct decision. The feedback system 950 may comprise human input, such as an administrator telling the artificial neural network 900 whether it made a correct decision. The feedback system may provide feedback (e.g., an indication of whether the previous output was correct or incorrect) to the artificial neural network 900 via input nodes 910a-n or may transmit such information to one or more nodes. The feedback system 950 may additionally or alternatively be coupled to the storage 970 such that output is stored. The feedback system may not have correct answers at all, but instead base feedback on further processing: for example, the feedback system may comprise a system programmed to identify faces, such that the feedback allows the artificial neural network 900 to compare its results to that of a manually programmed system.

The artificial neural network 900 may be dynamically modified to learn and provide better input. Based on, for example, previous input and output and feedback from the feedback system 950, the artificial neural network 900 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 900, such that the artificial neural network 900 may vary its nodes and connections to test hypotheses.

The artificial neural network 900 need not have a set number of processing nodes or number of sets of processing nodes, but may increase or decrease its complexity. For example, the artificial neural network 900 may determine that one or more processing nodes are unnecessary or should be repurposed, and either discard or reconfigure the processing nodes on that basis. As another example, the artificial neural network 900 may determine that further processing of all or part of the input is required and add additional processing nodes and/or sets of processing nodes on that basis.

The feedback provided by the feedback system 950 may be mere reinforcement (e.g., providing an indication that output is correct or incorrect, awarding the machine learning algorithm a number of points, or the like) or may be specific (e.g., providing the correct output). For example, the machine learning algorithm 900 may be asked to detect faces in photographs. Based on an output, the feedback system 950 may indicate a score (e.g., 75% accuracy, an indication that the guess was accurate, or the like) or a specific response (e.g., specifically identifying where the face was located).

The artificial neural network 900 may be supported or replaced by other forms of machine learning. For example, one or more of the nodes of artificial neural network 900 may implement a decision tree, associational rule set, logic programming, regression model, cluster analysis mechanisms, Bayesian network, propositional formulae, generative models, and/or other algorithms or forms of decision-making. The artificial neural network 900 may effectuate deep learning.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for validating and updating scripts associated with a plurality of software components of a software application, the system comprising:
   a user computing device comprising at least one first processor and a memory storing first computer-readable instructions that, when executed by the at least one first processor, cause the user computing device to:
      receive user input comprising a script associated with a software component of the plurality of software components; and
      send the script to a plurality of nodes of a peer-to-peer (P2P) network and an ordering server;
   a node, of the plurality of nodes of the P2P network, comprising at least one second processor and a memory storing second computer-readable instructions that, when executed by the at least one second processor, cause the node to send an endorsement response for the script, wherein the plurality of nodes are associated with corresponding local copies of a blockchain and local copies of a world state;
   the ordering server comprising at least one third processor and a memory storing third computer-readable instructions that, when executed by the at least one third processor, cause the ordering server to:
      receive, from the plurality of nodes of the P2P network, endorsement responses;
      generate a new block for addition to the local copies of the blockchain, wherein generating the new block comprises:
         generating a hash value based on the script, the endorsement responses, and an immediately preceding block hash in the blockchain, and
         generating the new block, wherein the new block comprises the script, the endorsement responses, the generated hash value, and the immediately preceding block hash in the blockchain; and
      send, to the plurality of nodes of the P2P network, the new block for addition to corresponding local copies of the blockchain and for updating the local copies of the world state to indicate the script; and
   a cognitive analytical system comprising a centralized data store, a dynamic script modifier, an artificial intelligence module, and at least one fourth processor and a memory storing fourth computer-readable instructions that, when executed by the at least one fourth processor, cause the cognitive analytical system to:
      query the world state to determine whether the world state indicates the script; and
      based on the world state indicating the script, add the script to the centralized data store, or modify the script via the dynamic script modifier and the artificial intelligence module and add the modified script to the centralized data store;
   wherein the third computer-readable instructions, when executed by the at least one third processor, further cause the ordering server to:
      generate, based on the script being added to the centralized data store, one or more test scripts for one or more software components of the plurality of software components;
      generate a second block, wherein the second block comprises the one or more test scripts; and
      send, to the plurality of nodes of the P2P network, the second block.

2. The system of claim 1, wherein the second computer-readable instructions, when executed by the at least one second processor, cause the node to update, based on the endorsement responses indicating that a majority of the plurality of nodes have validated the script associated with the software component, a corresponding local copy of the world state to indicate the script.

3. The system of claim 1, wherein the third computer-readable instructions, when executed by the at least one third processor, further cause the ordering server to determine the one or more software components based on determining linkages between the one or more software components and the software component.

4. The system of claim 1, wherein sending the script comprises invoking a smart contract for execution at the plurality of nodes, and wherein the smart contract is stored in the local copies of the blockchain.

5. The system of claim 4, wherein executing the smart contract at the plurality of nodes comprises determining if a user associated with the user computing device is authorized to submit the script.

6. The system of claim 4, wherein the script comprises an update for the software component, wherein executing the smart contract at the plurality of nodes comprises updating the software component based on the script.

7. The system of claim 4, wherein the script is for inclusion in the software component, wherein executing the smart contract at the plurality of nodes comprises updating the software component by including the script.

8. The system of claim 1, wherein the script is a test script for regression testing of the software component.

9. The system of claim 1, wherein sending the script associated with the software component to the plurality of nodes is based on determining that the plurality of nodes comprises endorsing nodes of the software component.

10. A method comprising:
- receiving, at an ordering server from a user computing device, a script associated with a software component of a plurality of software components of a software application;
- sending, to a plurality of nodes of a peer-to-peer (P2P) network, the script, wherein the plurality of nodes are associated with corresponding local copies of a blockchain and local copies of a world state;
- receiving, from the plurality of nodes, corresponding endorsement responses;
- generating a new block for addition to the local copies of the blockchain, wherein generating the new block comprises:
  - generating a hash value based on the script, the endorsement responses, and an immediately preceding block hash in the blockchain, and
  - generating the new block, wherein the new block comprises the script, the endorsement responses, the generated hash value, and the immediately preceding block hash in the blockchain; and
- sending, to the plurality of nodes of the P2P network, the new block for addition to the local copies of the blockchain and for updating the local copies of the world state to indicate the script;
- querying the world state to determine whether the world state indicates the script; and
- based on the world state indicating the script, adding the script to a cognitive analytical system comprising a centralized data store, a dynamic script modifier, and an artificial intelligence module, or modifying the script via the dynamic script modifier and the artificial intelligence module and adding the modified script to the centralized data store;
- generating, based on the script being added to the centralized data store, one or more test scripts for one or more software components of the plurality of software components;
- generating a second block, wherein the second block comprises the one or more test scripts; and
- sending, to the plurality of nodes of the P2P network, the second block.

11. The method of claim 10, further comprising updating, at a node and based on the endorsement responses indicating that a majority of the plurality of nodes have validated the script associated with the software component, a local copy of the world state to indicate the script.

12. The method of claim 10, further comprising determining the one or more software components based on determining linkages between the one or more software components and the software component.

13. The method of claim 10, wherein sending the script comprises invoking a smart contract for execution at the plurality of nodes, and wherein the smart contract is stored in the local copies of the blockchain.

14. The method of claim 13, wherein executing the smart contract at the plurality of nodes comprises determining if a user associated with the user computing device is authorized to submit the script.

15. The method of claim 13, wherein the script comprises an update for the software component, wherein executing the smart contract at the plurality of nodes comprises updating the software component based on the script.

16. The method of claim 13, wherein the script is for inclusion in the software component, wherein executing the smart contract at the plurality of nodes comprises updating the software component by including the script.

17. A non-transitory computer-readable medium storing computer-executable instructions that, when executed by a computer processor, causes a computer system to:
- receive, from a user computing device, a script associated with a software component of a plurality of software components;
- send, to a plurality of nodes of a peer-to-peer (P2P) network, the script, wherein the plurality of nodes are associated with corresponding local copies of a blockchain and local copies of a world state;
- receive, from the plurality of nodes, corresponding endorsement responses;
- generate a new block for addition to the local copies of the blockchain, wherein generating the new block comprises:
  - generating a hash value based on the script, the endorsement responses, and an immediately preceding block hash in the blockchain, and
  - generating the new block, wherein the new block comprises the script, the endorsement responses, the generated hash value, and the immediately preceding block hash in the blockchain; and
- send, to the plurality of nodes of the P2P network, the new block for addition to the local copies of the blockchain and for updating the local copies of the world state to indicate the script;
- querying the world state to determine whether the world state indicates the script; and
- based on the world state indicating the script, adding the script to a cognitive analytical system comprising a centralized data store, a dynamic script modifier, and an artificial intelligence module, or modifying the script via the dynamic script modifier and the artificial intelligence module and adding the modified script to the centralized data store;
- generating, based on the script being added to the centralized data store, one or more test scripts for one or more software components of the plurality of software components;
- generating a second block, wherein the second block comprises the one or more test scripts; and
- sending, to the plurality of nodes of the P2P network, the second block.

18. The non-transitory computer-readable medium of claim 17, wherein the instructions, when executed by the computer processor, causes the computer system to update, based on the endorsement responses indicating that a majority of the plurality of nodes have validated the script associated with the software component, a local copy of the world state to indicate the script.

* * * * *